US011500799B2

(12) United States Patent
Kamran et al.

(10) Patent No.: US 11,500,799 B2
(45) Date of Patent: Nov. 15, 2022

(54) MANAGING ACCESS TO A CPU ON BEHALF OF A BLOCK APPLICATION AND A NON-BLOCK APPLICATION

(71) Applicant: EMC IP Holding Company LLC, Hopkinton, MA (US)

(72) Inventors: Lior Kamran, Richon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 17/029,646

(22) Filed: Sep. 23, 2020

(65) Prior Publication Data

US 2022/0092008 A1    Mar. 24, 2022

(51) Int. Cl.
| | |
|---|---|
| G06F 13/20 | (2006.01) |
| G06F 16/16 | (2019.01) |
| G06F 9/48 | (2006.01) |

(52) U.S. Cl.
CPC ............ G06F 13/20 (2013.01); G06F 9/4881 (2013.01); G06F 16/16 (2019.01); *G06F 2213/40* (2013.01)

(58) Field of Classification Search
CPC ........ G06F 13/20; G06F 13/38; G06F 13/388; G06F 13/385; G06F 13/0635; G06F 13/4022; G06F 13/4027; G06F 13/4031; G06F 2213/40; G06F 16/16; G06F 9/4881
See application file for complete search history.

(56) References Cited

U.S. PATENT DOCUMENTS

| | | | |
|---|---|---|---|
| 4,937,777 A * | 6/1990 | Flood | G05B 19/052 |
| | | | 714/15 |
| 5,974,503 A | 10/1999 | Venkatesh et al. | |
| 5,987,621 A | 11/1999 | Duso et al. | |
| 6,061,504 A | 5/2000 | Tzelnic et al. | |
| 6,230,200 B1 | 5/2001 | Forecast et al. | |
| 6,625,750 B1 | 9/2003 | Duso et al. | |
| 9,323,575 B1 * | 4/2016 | Pho | G06F 9/462 |
| 9,356,919 B1 | 5/2016 | Yakoel et al. | |
| 9,438,626 B1 | 9/2016 | Zilberberg et al. | |
| 10,459,887 B1 * | 10/2019 | Dvortsov | G06F 3/0362 |
| 11,010,251 B1 | 5/2021 | Soukhman et al. | |
| 11,055,028 B1 | 7/2021 | Kamran et al. | |
| 11,106,557 B2 | 8/2021 | Soukhman et al. | |
| 11,126,361 B1 | 9/2021 | Shveidel et al. | |
| 11,144,461 B2 | 10/2021 | Soukhman et al. | |
| 11,232,010 B2 | 1/2022 | Kamran et al. | |
| 11,249,800 B2 | 2/2022 | Kamran et al. | |
| 2008/0168235 A1 * | 7/2008 | Watson | G06F 9/485 |
| | | | 711/135 |
| 2013/0191541 A1 * | 7/2013 | Kishan | G06F 9/5011 |
| | | | 709/226 |
| 2020/0076938 A1 * | 3/2020 | Agrawal | H04M 1/72415 |

* cited by examiner

Primary Examiner — Raymond N Phan
(74) Attorney, Agent, or Firm — BainwoodHuang

(57) ABSTRACT

A technique manages input/output(I/O)-critical tasks and background tasks within a computer device. The technique involves identifying tasks on the computer device as I/O-critical tasks and background tasks, accessing a ready task list that indicates any ready I/O-critical tasks and any ready background tasks, and based on the accessed ready task list, performing the tasks on the computer device. Such a technique enables the computer device to make better decisions that reduce I/O latencies while still efficiently utilizing central processing unit (CPU) cycles.

20 Claims, 9 Drawing Sheets

MANAGING ACCESS TO A CPU ON BEHALF OF A BLOCK APPLICATION AND A NON-BLOCK APPLICATION

BACKGROUND

Storing and safeguarding electronic content may be beneficial in modern business and elsewhere. Accordingly, various methodologies may be employed to protect and distribute such electronic content.

Several applications (e.g., block applications, file applications, etc.) may share a central processing unit (CPU). For example, a block application may voluntarily release of the CPU to allow other applications to also utilize the CPU. However, frequent attempts for CPU release may lead to significant performance degradation due to the incurred overhead.

SUMMARY

Unfortunately, a conventional CPU sharing approach may cause a significant increase in input/output (I/O) latencies of both the block application and the file application because since the conventional CPU sharing approach does not differentiate between I/O-critical tasks and background tasks. As a result, the conventional CPU sharing approach may prefer file background tasks over block I/O-critical tasks, and vice versa, which increases I/O latencies in both applications and may even cause client I/O timeouts.

Improved techniques are directed to managing I/O-critical and background tasks within a computer device that allows CPU sharing applications (e.g., sharing of the CPU between a block application and a non-block application). Such techniques enable the computer device to make better decisions that reduce I/O latencies while still efficiently utilizing CPU cycles. Moreover, such techniques (e.g., via use of starvation thresholds) enable the computer device to prevent starvation of background tasks.

In one example implementation, a computer-implemented method executed on a computer device may include, but is not limited to, identifying tasks on the computer device as I/O-critical tasks and background tasks, accessing a ready task list that indicates any ready I/O-critical tasks and any ready background tasks, and based on the accessed ready task list, performing the tasks on the computer device. With such differentiation between I/O-critical tasks and background tasks, the computer device is able to optimize I/O latency and avoid starvation of the background tasks. Such a method is well suited for CPU sharing situations, e.g., where a block application releases the CPU to a non-block application to share the CPU as the tasks of the applications are performed on the computer device.

In certain implementations, a computer-implemented method executed on a computing device may include, but is not limited to, determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

One or more of the following example features may be included. The CPU may be released from executing the block application for a predefined CPU execution release duration and a predefined CPU execution release interval based upon, at least in part, the CPU execution release interval and the CPU execution release duration. Determining the block application execution utilization on the CPU may include determining a percentage of time the block application is idle, and determining a percentage of time the block application is used. Determining the non-block application execution utilization on the CPU may include determining a CPU execution release time and a CPU execution resume time associated with the block application. Generating the CPU execution release interval and the CPU execution release duration for the block application may include comparing the block application utilization against one or more block application utilization thresholds, and comparing the non-block application utilization against one or more non-block application utilization thresholds. Generating the CPU execution release interval and the CPU execution release duration for the block application may include incrementally adjusting one or more of a previous CPU execution release interval and a previous CPU execution release duration. Generating the CPU execution release interval and the CPU execution release duration for the block application may include one or more of increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

In another example implementation, a computer program product resides on a computer readable medium that has a plurality of instructions stored on it. When executed by a processor, the instructions cause the processor to perform operations that may include, but are not limited to, determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

One or more of the following example features may be included. The CPU may be released from executing the block application for a predefined CPU execution release duration and a predefined CPU execution release interval based upon, at least in part, the CPU execution release interval and the CPU execution release duration. Determining the block application execution utilization on the CPU may include determining a percentage of time the block application is idle, and determining a percentage of time the block application is used. Determining the non-block application execution utilization on the CPU may include determining a CPU execution release time and a CPU execution resume time associated with the block application. Generating the CPU execution release interval and the CPU execution release duration for the block application may include comparing the block application utilization against one or more block application utilization thresholds, and comparing the non-block application utilization against one or more non-block application utilization thresholds. Generating the CPU execution release interval and the CPU execution release duration for the block application may include incrementally adjusting one or more of a previous CPU execution release interval and a previous CPU execution release duration. Generating the CPU execution release interval and the CPU execution release duration for the block application may include one or more of increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

In another example implementation, a computing system includes at least one processor and at least one memory architecture coupled with the at least one processor, wherein the at least one processor is configured to determine a block application execution utilization on a central processing unit (CPU) of the computing device. The at least one processor may be further configured to determine a non-block application execution utilization on the CPU. The at least one processor may be further configured to generate a CPU execution release interval and CPU execution release duration for the block application based upon, at least in part, the block application execution utilization and the non-block application execution utilization.

One or more of the following example features may be included. The CPU may be released from executing the block application for a predefined CPU execution release duration and a predefined CPU execution release interval based upon, at least in part, the CPU execution release interval and the CPU execution release duration. Determining the block application execution utilization on the CPU may include determining a percentage of time the block application is idle, and determining a percentage of time the block application is used. Determining the non-block application execution utilization on the CPU may include determining a CPU execution release time and a CPU execution resume time associated with the block application. Generating the CPU execution release interval and the CPU execution release duration for the block application may include comparing the block application utilization against one or more block application utilization thresholds, and comparing the non-block application utilization against one or more non-block application utilization thresholds. Generating the CPU execution release interval and the CPU execution release duration for the block application may include incrementally adjusting one or more of a previous CPU execution release interval and a previous CPU execution release duration. Generating the CPU execution release interval and the CPU execution release duration for the block application may include one or more of increasing the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry, and other equipment which are involved in managing I/O-critical tasks and background tasks within a computer device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

Like reference symbols in the various drawings indicate like elements.

DETAILED DESCRIPTION

Overview:

An improved technique is directed to managing input/output(I/O)-critical and background tasks within a computer device that allows CPU sharing applications (e.g., sharing of the CPU between a block application and a non-block application). Such a technique enables the computer device to make better decisions that reduce I/O latencies while still efficiently utilizing CPU cycles. Furthermore, such a technique enables the computer device to prevent starvation of background tasks.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Figure 1:
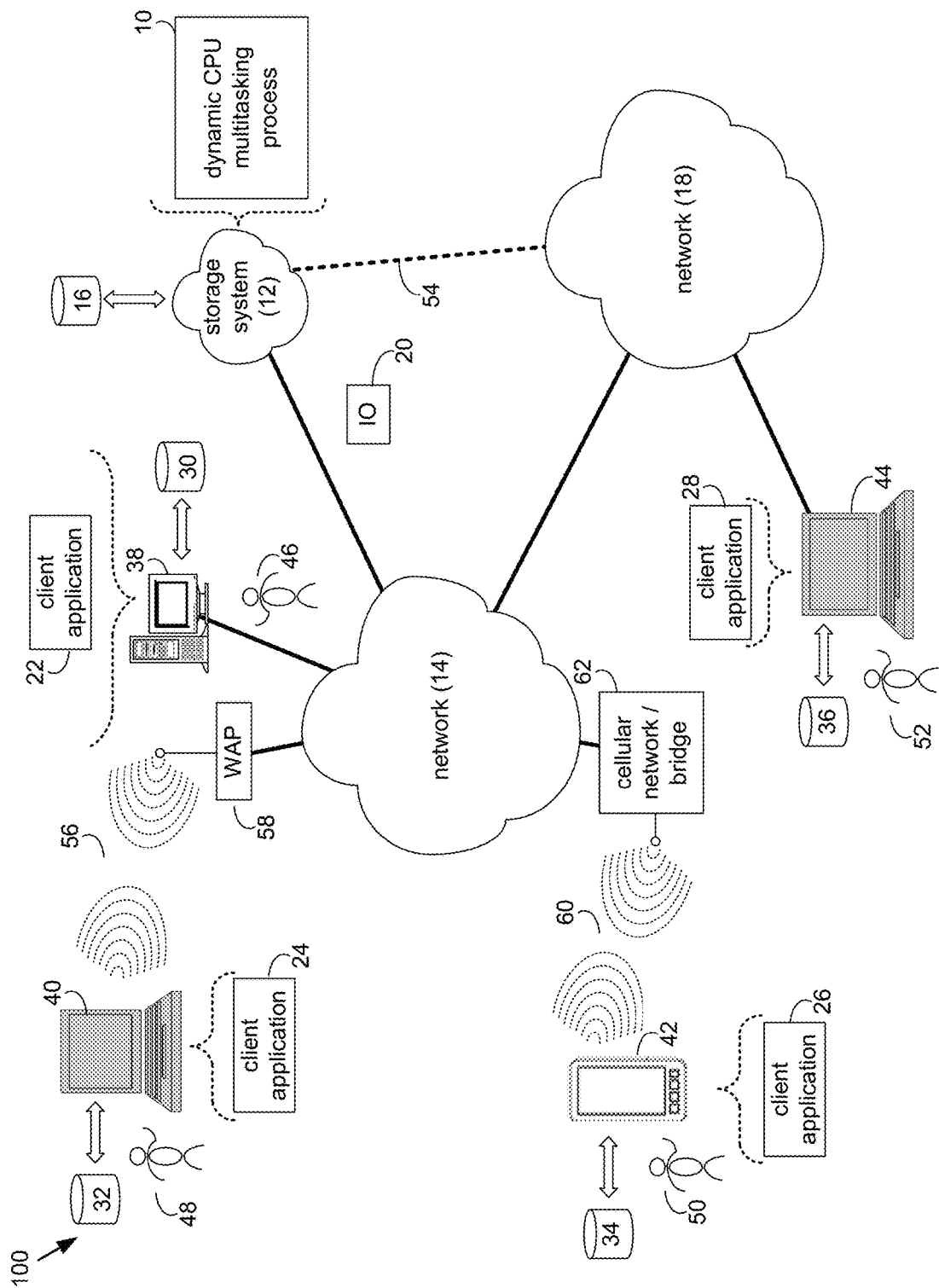
FIG. 1 is an example diagrammatic view of a storage system and a dynamic CPU multitasking process coupled to a distributed computing network according to one or more example implementations of the disclosure.

Referring to FIG. 1, there is shown dynamic CPU multitasking process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of dynamic CPU multitasking process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of dynamic CPU multitasking process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a dynamic CPU multitasking process, such as dynamic CPU multitasking process 10 of FIG. 1, may include but is not limited to, determining a block application execution utilization on a central processing unit (CPU) of the computing device. A non-block application execution utilization on the CPU may be determined. A CPU execution release interval and CPU execution release duration for the block application may be generated based upon, at least in part, the block application execution utilization and the non-block application execution utilization.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
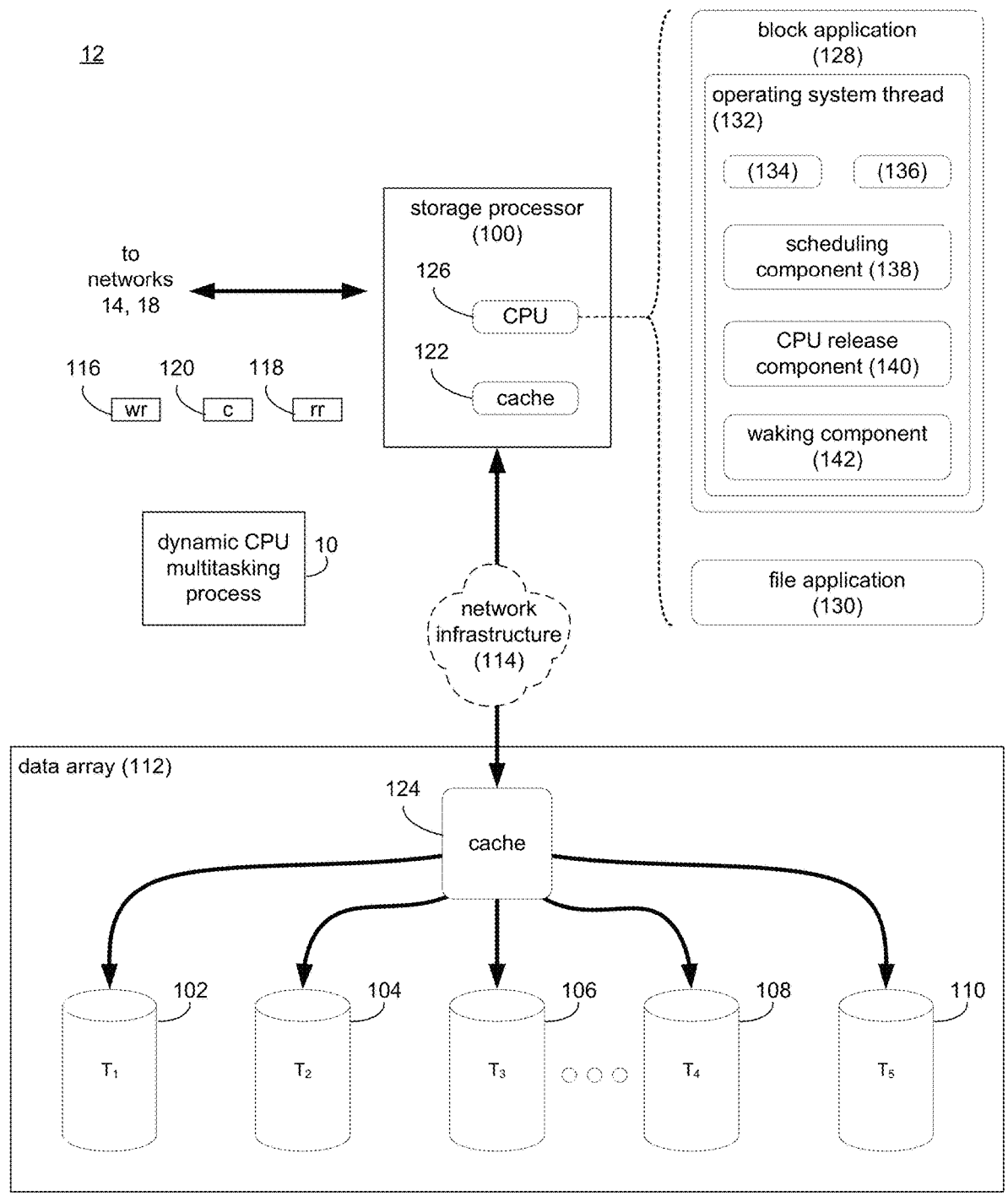
FIG. 2 is an example diagrammatic view of the storage system of FIG. 1 according to one or more example implementations of the disclosure.
Figure 3:
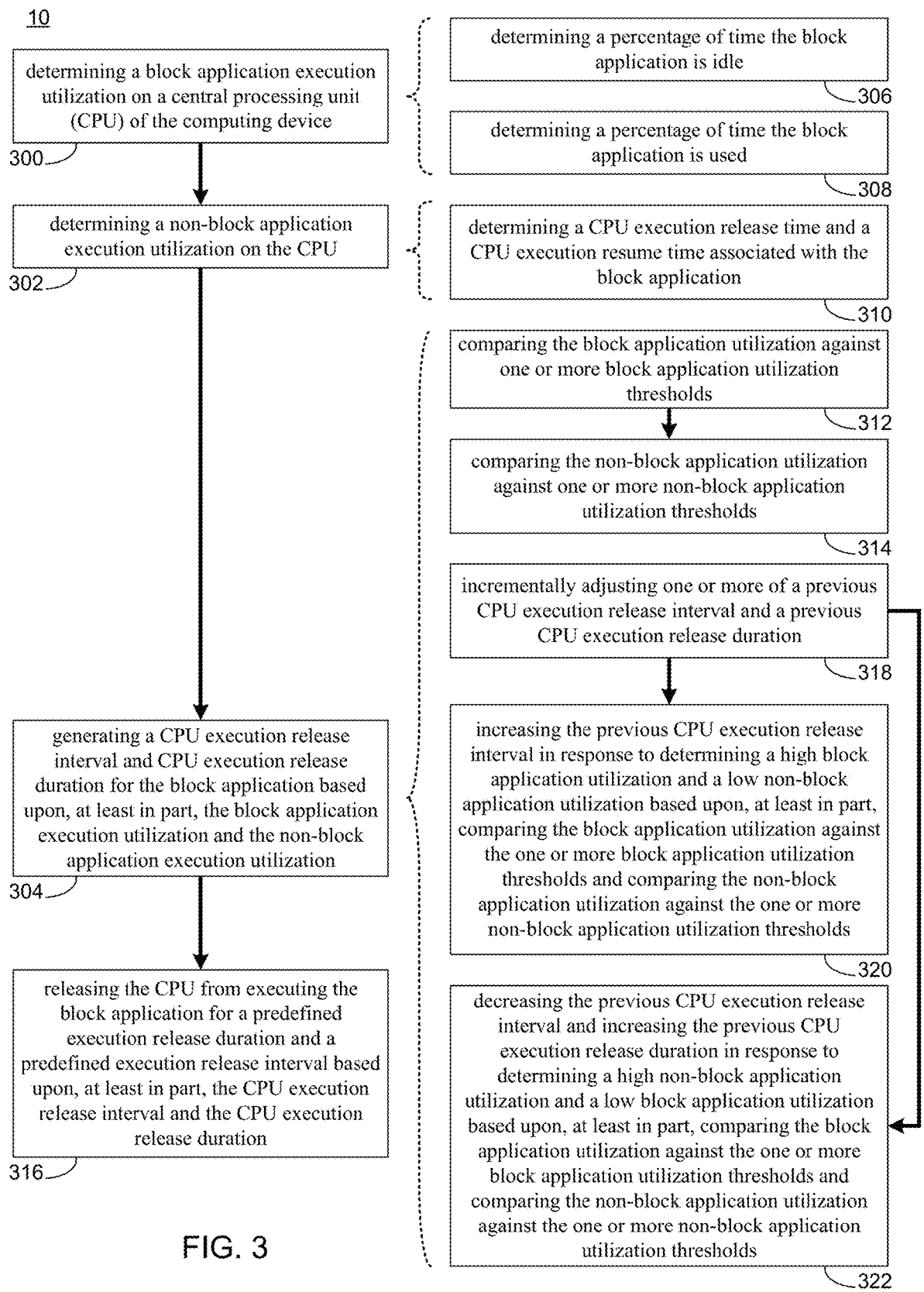
FIG. 3 is an example flowchart of dynamic CPU multitasking process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of dynamic CPU multitasking process 10. The instruction sets and subroutines of dynamic CPU multitasking process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of dynamic CPU multitasking process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of dynamic CPU multitasking process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of dynamic CPU multitasking process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage processor 100 may include one or more central processing units (CPUs) (e.g., CPU 126). In some implementations, the one or more CPUs may include a multicore CPU. As is known in the art, a multicore CPU may be configured to execute multiple threads or processes concurrently on each core. However, it will be appreciated that CPU 126 may not be a multicore CPU within the scope of the present disclosure. In some implementations, CPU 126 may execute one or more applications (e.g., block application 128 and file application 130). A block application (e.g., block application 128) may generally execute a single operating system thread per CPU core of a multicore CPU (e.g., CPU 126), which may implement block functionality on data array 112.

In some implementations, block application 128 may run on top of a Preemptive Operating System (OS). As is known in the art, a Preemptive OS generally allows the operating system to preempt (i.e. stop) a running operating system thread without the operating system thread's cooperation, and execute something else, for example another operating system thread. An operating system thread may generally include multiple sub-threads as lightweight implementations of an operating system thread. For example, block application 128 may include an operating system thread (e.g., operating system thread 132) with a plurality of sub-threads (e.g., sub-threads 134, 136). While an example of e.g., one operating system thread with e.g., two sub-threads has been described above, it will be appreciated that any number of operating system threads and sub-threads for each operating system thread may be used within the scope of the present disclosure. In some implementations, a file application (e.g., file application 130) may generally organize data as a single piece of information inside a folder within data array 112. When data from a particular folder or file needs to be accessed, storage processor 100 requires a path to locate the data within data array 112.

In some implementations, each operating system thread (e.g., operating system thread 132) may implement a scheduling component (e.g., scheduling component 138) configured to schedule the execution of the plurality of sub-threads (e.g., sub-threads 134, 136). In some implementations, each operating system thread (e.g., operating system thread 132) may be configured to poll its interfaces for new events (e.g., polling for completions of submitted IO requests to data array 112) and polls for new IO requests from the user (e.g., client devices 38, 40, 42, 44). Accordingly, each operating system thread may fully utilize the CPU or CPU core it's running on, because even when there's no actual work, the operating system thread may continuously check its interfaces. In some implementations, this always-polling design may be optimized for a storage system that requires low latency and high IOPS (I/O per second) as there are no context switches and no interrupts involved.

In some implementations, storage system 12 may process background operations which may run during the processing of IO requests from a user, but also when no IOs are present. In some implementations, background operations may include compression, de-duplication, meta-data defragmentation, calculation of RAID protection from media failures, etc. Furthermore, storage system 12 may defer some background processing to be executed when there is less IO load from the user, to serve IO requests more quickly, thus reducing the latency and improving the storage system performance. In some implementations, background operations may be a fundamental part of storage system 12. For example, suppose storage system 12 includes a log-structured file system (LFS) that performs defragmentation and garbage collection on metadata. Accordingly, the ability to multitask background IO requests may contribute to the efficient operation of storage system 12.

As discussed above, suppose storage system is required to run another application, for example a file application (e.g., file application 130). Storage system use patterns may dynamically change over time (i.e. the user of the system can use only the block application for some time and then use only the file application, and it can also use both of them simultaneously, each with a different load that can also change. Therefore, storage system 12 may be required to dynamically adapt to the user operation pattern of the two applications to support dynamic load balancing. As will be discussed in greater detail below, dynamic CPU multitasking process 10 may allow storage system 12 to dynamically multitask CPU operations for sub-threads (e.g., sub-threads 134, 136) of an operating system thread (e.g., operating system thread 132) of a block application (e.g., block application 128) and other non-block applications (e.g., file application 130).

The Dynamic CPU Multitasking Process:

Referring also to FIGS. 3-8 and in some implementations, dynamic CPU multitasking process 10 may determine 300 a block application execution utilization on a central processing unit (CPU) of the computing device. A non-block application execution utilization on the CPU may be determined 302. A CPU execution release interval and CPU execution release duration for the block application may be generated 304 based upon, at least in part, the block application execution utilization and the non-block application execution utilization.

As will be discussed in greater detail below, implementations of the present disclosure may allow a block application and a non-application to efficiently share a CPU by dynamically adjusting CPU release times and/or CPU release durations. Dynamic CPU multitasking process 10 may provide a way for a block application (e.g., block application 128) to share the CPU with the other applications. In some implementations, dynamic CPU multitasking process 10 may involve the voluntarily release of the CPU by block application 128, to allow other applications (e.g., file application 130) to also utilize the CPU. However, frequent attempts for CPU release may lead to significant performance degradation due to the incurred overhead.

For example, if block application 128 releases the CPU every e.g., 50 µs for e.g., 50 µs, and file application 130 only consumes e.g., 20 µs each time, and that each context-switch takes e.g., 2 µs, then the overhead may be about e.g., 5.4% (4/(4+50+20)). Alternatively, if block application 128 releases the CPU every e.g., 100 µs, and file application 130 consumes e.g., 40 µs, then the overhead will be about 2.7%, which is half the overhead of the first distribution.

In addition, if file application 130 does not need the CPU, there may not be any context-switches, but there will still be a penalty resulting from block application decreasing and increasing its priority every e.g., 50 µs. Assuming priority change take about 1 µs, then the overhead may be be about 3.84% (2/(2+50)). Alternatively, if block application 128 would try to release the CPU every e.g., 100 µs, then the overhead will be about 1.96%.

In some implementations of the present disclosure, dynamic CPU multitasking process 10 may determine the actual CPU usage of both applications and adapt the CPU release times and durations in order to minimize the overhead and improve the system performance. In this manner, dynamic CPU multitasking process 10 may "learn" the CPU requirements of block applications and non-block applications in order to reduce the number of context-switches (i.e., CPU cycles that are not used for any process).

In some implementations, dynamic CPU multitasking process 10 may utilize a priority system (e.g. priorities of the Real-Time scheduler in Linux®) of the scheduling component (e.g., scheduling component 138) in order to avoid this overhead.

In some implementations and as will be discussed in greater detail below, dynamic CPU multitasking process 10 may release the CPU by lowering the execution priority of the operating system thread below the execution priority of the non-block application for a defined period of time. In some implementations, when the operating system thread (e.g., operating system thread 132) releases the CPU (e.g., CPU 126), dynamic CPU multitasking process 10 may lower the execution priority of the operating system thread to be lower than the other non-block application for the defined period of time. In some implementations and referring also to the example of FIG. 4, dynamic CPU multitasking process 10 may execute first sub-thread 134 with a first execution priority (e.g., execution priority "p0"). In some implementations, the first execution priority (e.g., execution priority "p0") may be the highest possible priority that is lower than the execution priority of kernel jobs and, as will be discussed in greater detail below, higher than the execution priority of a non-block application (e.g., file application 130). In some implementations, dynamic CPU multitasking process 10 may release the CPU (e.g., after first sub-thread 134 has finished or has reached a breakpoint) by lowering the execution priority of operating system thread (e.g., from execution priority "p0" to execution priority "p1"). In this example, dynamic CPU multitasking process 10 may lower the execution priority of operating system thread 132 from "p0" to "p1" for the defined period of time starting from time "t0" to "t1" (e.g., the defined period of time).

In some implementations, dynamic CPU multitasking process 10 may execute one of a non-block application and a sub-thread of an operating system thread based upon, at least in part, an execution priority of the operating system thread and an execution priority of the application. Referring also to the example of FIG. 5 and in some implementations, dynamic CPU multitasking process 10 may define an execution priority for a non-block application (e.g., file application 130) to be lower than that of the operating system thread when the operating system thread is executing a sub-thread (e.g., first sub-thread 134) on the CPU (e.g., execution priority "p2"). In one example, suppose file application is ready to be executed on the CPU at time "t0". Referring also to the example of FIG. 6, dynamic CPU multitasking process 10 may execute the first sub-thread (e.g., first sub-thread 134) of operating system thread 132 on the CPU until dynamic CPU multitasking process 10 releases the CPU at time "t0" until time "t1". As discussed above and in some implementations, dynamic CPU multitasking process 10 may release the CPU from executing sub-threads of the operating system thread by lowering the execution priority of operating system thread 132 from priority "p0" to priority "p1". In this example, at time "t0", dynamic CPU multitasking process 10 may execute 304 file application 130 based upon, at least in part, an execution priority of the operating system thread and an execution priority of the application. For example, because file application 130 has a higher execution priority (e.g., execution priority "p2") than the operating system thread (e.g., execution priority "p1"), dynamic CPU multitasking process 10 may execute file application 130 on the CPU until time "t1".

Figure 4:
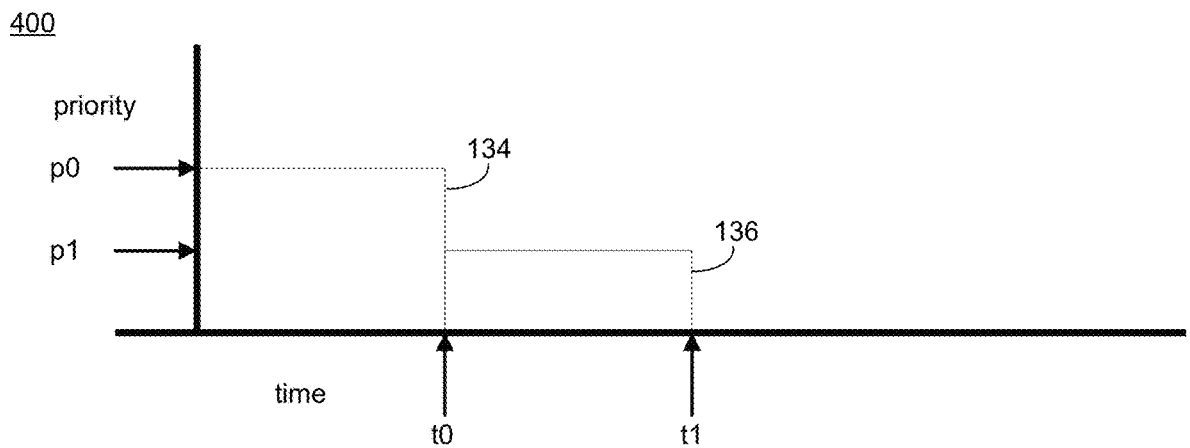
FIGS. 4-8 are example diagrammatic views of the execution of operating system threads and/or applications according to one or more example implementations of the disclosure.
Figure 5:
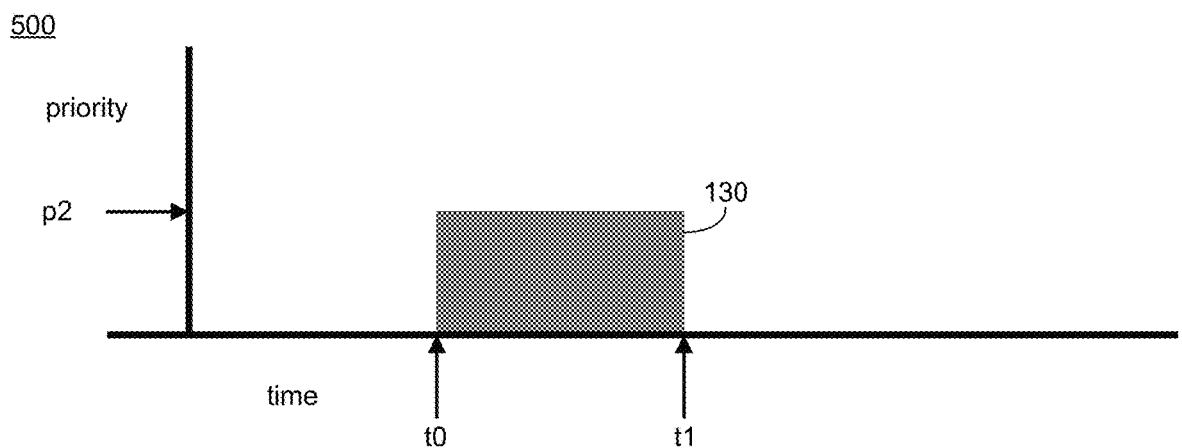
Figure 6:
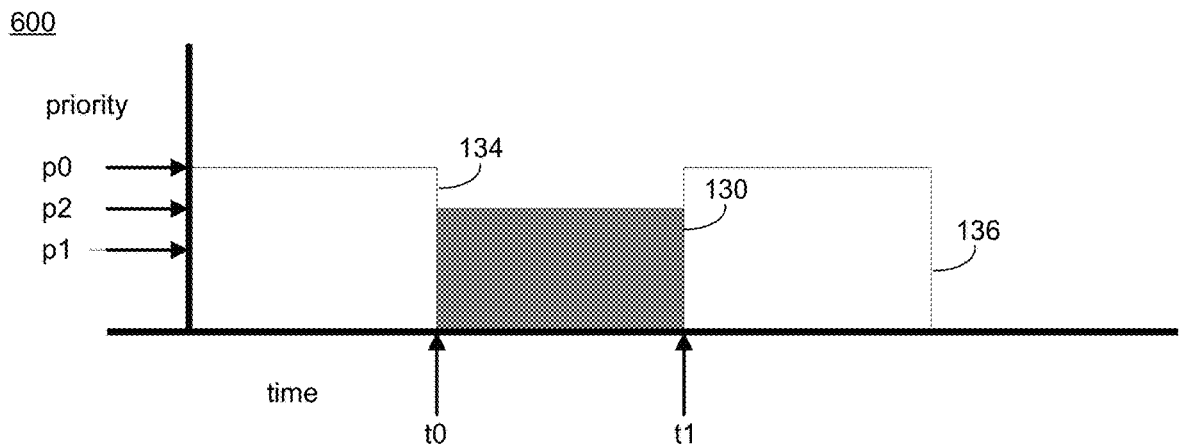

In some implementations, dynamic CPU multitasking process 10 may raise the execution priority of the operating system thread above the execution priority of the application after the defined period of time. Referring again to the example of FIG. 6 and in some implementations, dynamic CPU multitasking process 10 may raise the execution priority of operating system thread 132 after the defined period of time (e.g., after time "t1") from a lower execution priority (e.g., execution priority "p1") to a higher execution priority (e.g., execution priority "p0" which is higher than execution priority "p2" used for file applications). In some implementations, dynamic CPU multitasking process 10 may raise the execution priority of operating system thread 132 using another operating system thread. For example, dynamic CPU multitasking process 10 may cause another operating system thread to increase the priority of operating system thread 132. When its execution priority is increased from execution priority "p1" as shown in FIG. 4 to execution priority "p0" as shown in FIG. 6 at time "t1", operating system thread 132 may immediately get scheduled back and execute second sub-thread 136 on the CPU.

In some implementations, dynamic CPU multitasking process 10 may determine 300 a block application execution utilization on a central processing unit (CPU) of the computing device. As discussed above and in some implementations, a block application (e.g., block application 128) may generally execute a single operating system thread per CPU core of a multicore CPU (e.g., CPU 126), which may implement block functionality on data array 112. In some implementations, dynamic CPU multitasking process 10 may determine 300 a block application execution utilization by a block application (e.g., block application 128) on the CPU (e.g., CPU 126). For example, a block application execution utilization may generally include a measurement of an amount of time the block application is executed on the CPU.

In some implementations, determining 300 the block application execution utilization on the CPU may include determining 306 a percentage of time the block application is idle and determining 308 a percentage of time the block application is used. For example, dynamic CPU multitasking process 10 may measure the actual CPU usage of block application (e.g., block application 128) during a period of time. In some implementations, the block application (e.g., block application 128) may be the main application of the storage system (e.g., storage system 12) and because the block application decides when to release and CPU and for how long, dynamic CPU multitasking process 10 may determine 306 or measure the actual percentage of time the block application is idle (e.g., block application idle percentage (BIP)). In some implementations, dynamic CPU multitasking process 10 may similarly determine 308 or measure the actual percentage of time the block application is used (e.g., a block application used percentage (BUP)).

In some implementations, dynamic CPU multitasking process 10 may determine 302 a non-block application execution utilization on the CPU. As discussed above, a non-block application may generally include file applications, user applications, etc. In some implementations, a file application (e.g., file application 130) may generally organize data as a single piece of information inside a folder within data array 112. When data from a particular folder or file needs to be accessed, storage processor 100 requires a path to locate the data within data array 112.

In some implementations, determining 302 the non-block application execution utilization on the CPU may include determining 310 a CPU execution release time and a CPU execution resume time associated with the block application. For example and in some implementations, dynamic CPU multitasking process 10 may determine 302 or measure the actual time used by the file application when an operating system thread attempts to release the CPU. In some implementations, several cases may occur when a block application (e.g., operating system thread 132 of block application 128) attempts to release the CPU for a file application (e.g., file application 130). In one case, dynamic CPU multitasking process 10 may determine that the file application (e.g., file application 130) does not need the CPU, so no context-switch will occur. This may be referred to as a "Not Used Release" (NUR). In some implementations, a not used release (NUR) may indicate the number of times a CPU is released but not used by a non-block application (e.g., file application 130). In some implementations, dynamic CPU multitasking process 10 may measure the time before decreasing the priority (e.g., CPU execution release time associated with the block application) and after the operating system thread resumed executing (e.g., CPU execution resume time associated with the block application). In some implementations, the information about whether a context-switch happened or not may be obtained from the operating system (e.g. in Linux® 'getrusage').

In another case, dynamic CPU multitasking process 10 may determine 302 that the file application consumes less than the given time so the operating system thread was scheduled back. This may be referred to as a "Partly Used Release" (PUR). In some implementations, a partly used release (PUR) may indicate the number of times a non-block application consumes less than the time the CPU is released for such that an operating system thread switches back. In some implementations, dynamic CPU multitasking process 10 may determine 302 the non-block application execution utilization on the CPU by measuring the time before decreasing the execution priority of operating system thread (e.g., determining 310 a CPU execution release time associated with the block application) and the time after the operating system thread resumes (determining 312 a CPU execution resume time associated with the block application).

In yet another case, dynamic CPU multitasking process 10 may determine 302 that the file application (e.g., file application 130) consumes all the given time, therefore another operating system thread may increase the execution priority of the suspended operating system thread. This may be referred to as a "Fully Used Release" (FUR). In some implementations, a fully used release (FUR) may indicate the number of times a non-block application consumes all of the time the CPU is released for. In some implementations, dynamic CPU multitasking process 10 may determine 302 the non-block application execution utilization on the CPU by measuring the duration that the operating system thread was suspended. In some implementations, this non-block application execution utilization may also be obtained by the operating system thread that increases the execution priority of the suspended operating system thread indicating that it has increased the execution priority of the suspended operating system thread in memory visible to all operating system threads.

In some implementations, dynamic CPU multitasking process 10 may generate 304 a CPU execution release interval and CPU execution release duration for the block application based upon, at least in part, the block application execution utilization and the non-block application execution utilization. For example, and as discussed above, dynamic CPU multitasking process 10 may generate 304 a CPU execution release interval (CRI) that defines the continuous time that an operating system thread runs until it tries to release the CPU and a CPU execution release duration (CRD) that defines the maximum time the non-block application is given before the operating system thread of the block application is scheduled back. In some implementations, generating 304 the CPU execution release interval (CRI) and the CPU execution release duration (CRD) may be based upon, at least in part, the block application execution utilization (e.g., block application idle percentage (BIP) and block application used percentage (BUP)) and the non-block application execution utilization (e.g., a CPU execution release time and a CPU execution resume time associated with the block application based upon, at least in part, a number of not used releases (NURs), a number of partly used releases (PURs), and/or a number of fully used releases (FURs)).

In some implementations, generating 304 the CPU execution release interval and the CPU execution release duration for the block application based upon, at least in part, the block application execution utilization and the non-block application execution utilization may generally include prolonging the CPU execution release interval (CRI) when the non-block application (e.g., file application 130) is not fully consuming the granted time, to reduce the CPU release frequency and reduce the overhead resulting from frequent CPU releasing. In some implementations, generating 304 the CPU execution release interval and the CPU execution release duration for the block application based upon, at least in part, the block application execution utilization and the non-block application execution utilization may generally include prolonging the CPU execution release duration (CRD) when the non-block application (e.g., file application 130) has high CPU utilization while the block application has low CPU utilization.

In some implementations, generating 304 the CPU execution release interval and the CPU execution release duration for the block application may include comparing 312 the block application utilization against one or more block application utilization thresholds and comparing 314 the non-block application utilization against one or more non-block application utilization thresholds. In some implementations, dynamic CPU multitasking process 10 may receive and/or define one or more block application utilization thresholds and/or one or more non-block application utilization thresholds. For example, dynamic CPU multitasking process 10 may receive (e.g., from a user, from another process, etc.) one or more block application utilization thresholds. In some implementations, the one or more block application utilization thresholds may include a low block application idle percentage (BIP), a high block application idle percentage (BIP), a low block application used percentage (BUP), and a high block application used percentage (BUP). In some implementations, the low block application idle percentage may define a threshold minimum for a block application idle percentage indicative that the block application is very active on the CPU. Similarly, the low block application used percentage may define a threshold minimum for a block application use percentage indicative that the block application is not very active on the CPU. In some implementations, the high block application idle percentage may define a threshold maximum for a block application idle percentage indicative that the block application is inactive on the CPU. Similarly, the high block application used percentage may define a threshold maximum for a block application use percentage indicative that the block application is very active on the CPU. In some implementation and as will be discussed in greater detail below, these block application utilization thresholds may be used by dynamic CPU multitasking process 10 to generate 304 the CPU execution release interval and the CPU execution release duration.

In some implementations, the one or more non-block application utilization thresholds may include a low not used release (NUR) threshold, a high not used release (NUR) threshold, a low partly used release (PUR) threshold, a high partly used release (PUR) threshold, a low fully used release (FUR) threshold, and a high fully used release (FUR) threshold. In some implementations, the low not used release (NUR) threshold may define a threshold minimum number of times and/or amount of time that no non-block application is ready or available for execution on the CPU. Similarly, the low partly used release (PUR) threshold may define a threshold minimum number of times and/or amount of time that non-block applications consume less than the given time so an operating system thread is scheduled back and the low fully used release (FUR) threshold may define a threshold minimum number of times and/or amount of time that the non-block application(s) consume all of the time the CPU is released for. In some implementations, the high not used release (NUR) threshold may define a threshold maximum number of times and/or amount of time that no non-block application is ready or available for execution on the CPU. Similarly, the high partly used release (PUR) threshold may define a threshold maximum number of times and/or amount of time that non-block applications consume less than the given time and the high fully used release (FUR) threshold may define a threshold maximum number of times and/or amount of time that the non-block application(s) consume all of the time the CPU is released for. In some implementation and as will be discussed in greater detail below, these non-block application utilization thresholds may be used by dynamic CPU multitasking process 10 to generate 304 the CPU execution release interval and the CPU execution release duration. In some implementations, the actual block application utilization thresholds and non-block application utilization thresholds may be user-defined, pre-defined, and/or automatically defined by dynamic CPU multitasking process 10.

In some implementations, dynamic CPU multitasking process 10 may release 316 the CPU from executing the block application for a predefined CPU execution release duration and a predefined CPU execution release interval based upon, at least in part, the CPU execution release interval and the CPU execution release duration. Referring also to the example of FIG. 7 and in some implementations, dynamic CPU multitasking process 10 may execute a first sub-thread (e.g., first sub-thread 134) of an operating system thread (e.g., operating system thread 132) for a period of time (e.g., 50 µs). At time "t0", dynamic CPU multitasking process 10 may release the CPU from executing the block application for a predefined execution release duration and a predefined execution release interval. In this example, dynamic CPU multitasking process 10 may initially release 316 the CPU for e.g., 50 µs every e.g., 50 µs. At time "t1", no non-block application may be ready or available to execute on the CPU and dynamic CPU multitasking process 10 may determine that at time "t1", a not used release (NUR) occurred.

Accordingly and as discussed above, dynamic CPU multitasking process 10 may resume execution the operating system thread (e.g., operating system thread 132) of a block application (e.g., block application 128). At time "t2", dynamic CPU multitasking process 10 may determine or measure a period of time where block application 128 is idle. After the CPU execution release interval (e.g., 50 µs) at time "t3", dynamic CPU multitasking process 10 may release 316 the CPU from executing block application 128 for a predefined execution release duration (e.g., 50 µs). In this example, at time "t4" or after the CPU is released, dynamic CPU multitasking process 10 may execute a non-block application (e.g., file application 130) on the CPU. At time "t5", however, file application 130 may finish its execution before the end of the CPU release duration (e.g., 50 µs). In this example, dynamic CPU multitasking process 10 may determine that at time "t5", a partly used release (PUR) occurred (e.g., file application 130 executes for only 33 µs). Additionally at time "t5", dynamic CPU multitasking process 10 may execute operating system thread 132 of block application 128 in response to file application 130 finishing its execution before the end of the CPU release duration.

In some implementations, generating 304 the CPU execution release interval and the CPU execution release duration for the block application may include incrementally adjusting 318 one or more of a previous CPU execution release interval and a previous CPU execution release duration. Returning again to the example of FIG. 7 and in some implementations, at time "t6", dynamic CPU multitasking process 10 may generate 304 a CPU execution release interval and CPU execution release duration for the block application based upon, at least in part, the block application execution utilization and the non-block application execution utilization. For example, in response to determining that file application 130 had a high NUR (e.g., where the NUR threshold for high NUR, in this example, is e.g., one or more NURs in less than three CPU release intervals), dynamic CPU multitasking process 10 may incrementally adjust 318 one or more of a previous CPU execution release interval and a previous CPU execution release duration (e.g., adjust 318 the CPU execution release duration from e.g., 50 μs to e.g., 100 μs). At time "t6", dynamic CPU multitasking process 10 may release 316 the CPU from executing the block application for the adjusted execution release duration (e.g., 50 μs) and the adjusted execution release interval (e.g., 100 μs). At time "t7", no non-block application may be ready or available to execute on the CPU and dynamic CPU multitasking process 10 may determine that at time "t7", a not used release (NUR) occurred. Accordingly and as discussed above, dynamic CPU multitasking process 10 may resume execution the operating system thread (e.g., operating system thread 132) of a block application (e.g., block application 128). This may be repeated at time "t8" where dynamic CPU multitasking process 10 may release 316 the CPU from executing the block application at the adjusted execution release interval (e.g., 100 μs) and at time "t9", dynamic CPU multitasking process 10 may determine that a not used release (NUR) occurred.

In this example, dynamic CPU multitasking process 10 may generate 304 a CPU execution release interval and CPU execution release duration for the block application based upon, at least in part, the block application execution utilization and the non-block application execution utilization. For example, in response to determining that file application 130 had a high NUR (e.g., where the NUR threshold for high NUR, in this example, is e.g., one or more NURs in less than three CPU release intervals), dynamic CPU multitasking process 10 may incrementally adjust 318 one or more of a previous CPU execution release interval and a previous CPU execution release duration (e.g., adjust 318 the CPU execution release interval from e.g., 100 μs to e.g., 150 μs). At time "t10", dynamic CPU multitasking process 10 may release 316 the CPU from executing the block application at the adjusted execution release interval (e.g., 150 μs). At time "t11", dynamic CPU multitasking process 10 may determine that a not used release (NUR) occurred. While the period of time between releasing the CPU and either the file application executing or the operating system thread executing on the CPU is shown as a relatively large amount of time on the timeline of FIG. 7, it will be appreciated that this is for example purposes only as the switch time between releasing the CPU and executing the file application or the operating system thread may be much smaller than the CPU execution release duration or CPU execution release interval. It will also be appreciated that incrementally adjusting 318 one or more of the CPU execution release interval and the CPU execution release duration may occur at any time or interval and/or in response to any change in the block application execution utilization and/or the non-block application execution utilization within the scope of the present disclosure.

In some implementations, generating 304 the CPU execution release interval and the CPU execution release duration for the block application may include one or more of: increasing 320 the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds, and decreasing 322 the previous CPU execution release interval and increasing the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds.

Figure 7:
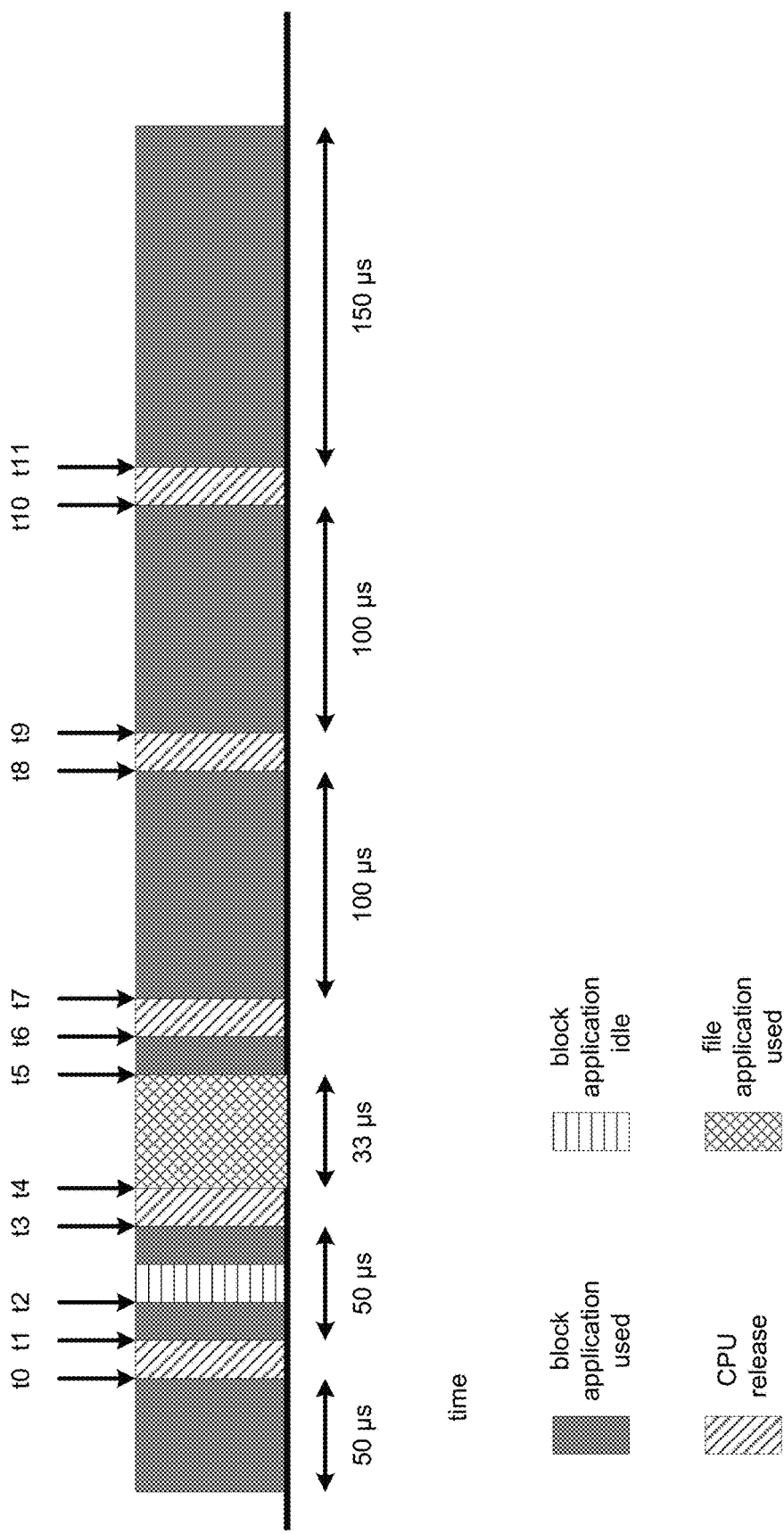
Figure 8:
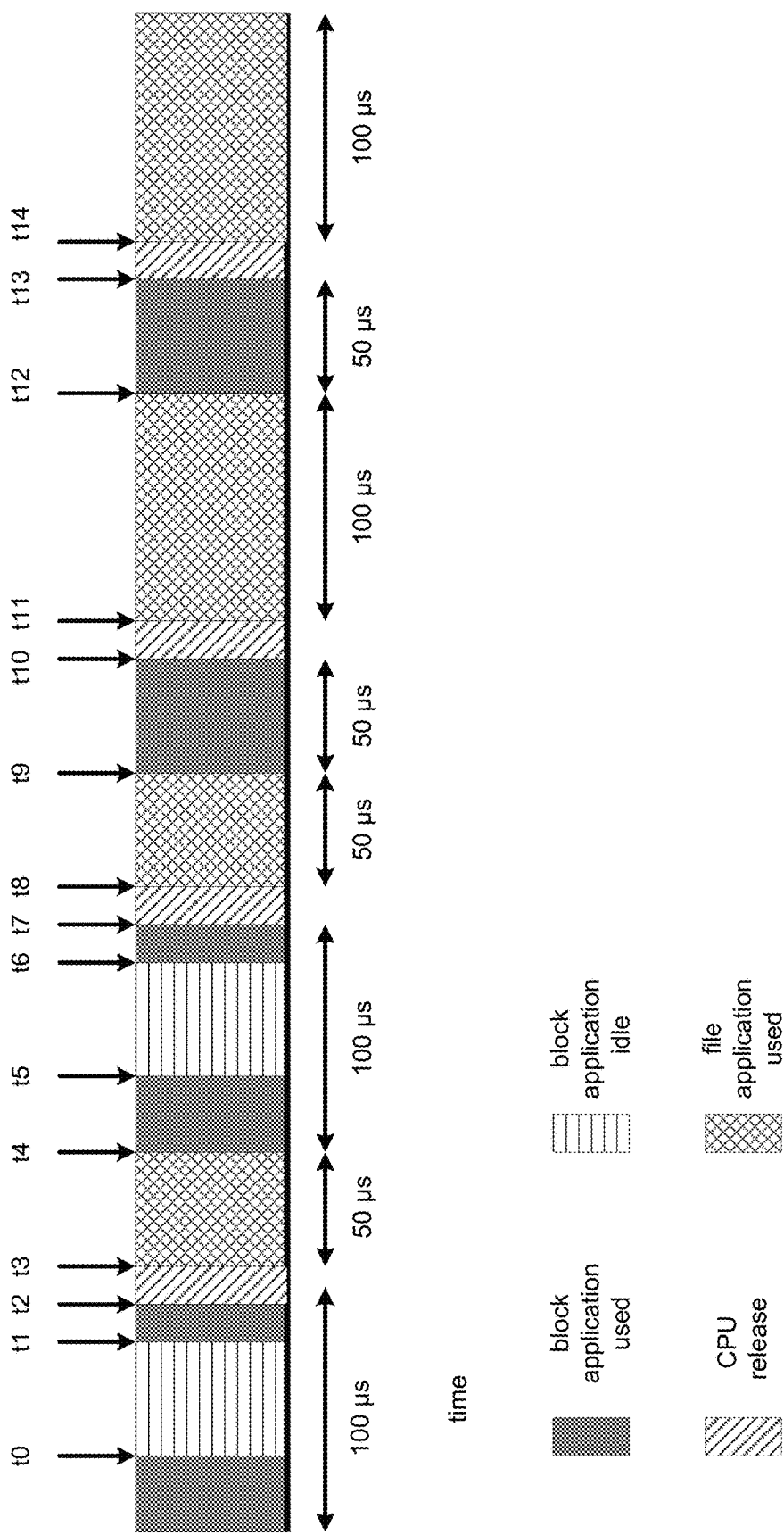

Referring again to the example of FIG. 7 and as discussed above, dynamic CPU multitasking process 10 may increase 320 the previous CPU execution release interval in response to determining a high block application utilization and a low non-block application utilization based upon, at least in part, comparing the block application utilization against the one or more block application utilization thresholds and comparing the non-block application utilization against the one or more non-block application utilization thresholds. As discussed above and as shown in the example of FIG. 7, dynamic CPU multitasking process 10 may incrementally increase the CPU execution release interval from e.g., 50 μs to e.g., 100 μs and finally to e.g., 150 μs. For example, at time "t6", dynamic CPU multitasking process 10 may increase 320 the previous CPU release interval from e.g., 50 μs to e.g., 100 μs in response to comparing the non-block application utilization to one or more non-block application utilization thresholds (e.g., NUR threshold for high NUR, in this example, is e.g., one or more NURs in less than three CPU release intervals).

Similarly, at time "t10", dynamic CPU multitasking process 10 may increase 320 the previous CPU release interval from e.g., 100 μs to e.g., 150 μs in response to comparing the non-block application utilization to one or more non-block application utilization thresholds (e.g., NUR threshold for high NUR, in this example, is e.g., one or more NURs in less than three CPU release intervals). While the example of FIG. 7 increases the CPU execution release interval by e.g., 50 μs, it will be appreciated that the CPU execution release interval (CRI) may be increased by any amount of time and/or may be increased incrementally by any amount (i.e., increased by different amounts of time) within the scope of the present disclosure.

In some implementations, the CPU execution release interval (CRI) and/or the CPU execution release duration (CRD) may be adjusted gradually, to let the storage system adapt to the CPU usage changes of the applications and avoid major changes in the CPU allocation which may cause to increased latency and starvation issues. Adjusting these durations may allow the relevant application run for longer durations without incurring a priority change penalty, when the other application is idle or only requires low CPU utilization.

In some implementations, dynamic CPU multitasking process 10 may decrease 322 the previous CPU execution release interval and increase the previous CPU execution release duration in response to determining a high non-block application utilization and a low block application utilization based upon, at least in part, comparing the block application utilization against the one or more block application utilization thresholds and comparing the non-block application utilization against the one or more non-block application utilization thresholds. Referring also to the example of FIG. 8 and in some implementations, dynamic CPU multitasking process 10 may execute a sub-thread (e.g., first sub-thread 134) of an operating system thread (e.g., operating system thread 132) on a CPU (e.g., CPU 126).

In this example, dynamic CPU multitasking process 10 may determine that at time "t0", the operating system thread is idle until time "t1". At time "t2", dynamic CPU multitasking process 10 may release the CPU from executing the block application for a predefined CPU execution release duration and a predefined CPU execution release interval. In this example, the predefined CPU execution release duration may be e.g., 50 µs and the predefined CPU execution release interval may be e.g., 100 µs. However, it will be appreciated that the predefined CPU execution release interval and the predefined CPU execution release duration may be any value within the scope of the present disclosure.

At time "t3", dynamic CPU multitasking process 10 may execute a non-block application (e.g., file application 130) on the CPU for e.g., 50 µs or the entire predefined CPU execution release duration. In this example, dynamic CPU multitasking process 10 may have raised the priority of the suspended operating system thread in order to schedule back operating system thread 132 after the end of the predefined CPU execution release duration. Accordingly, dynamic CPU multitasking process 10 may determine that a full used release (FUR) occurred at time "t4". At time "t4", another operating system thread may raise the priority of operating system thread 132 such that operating system thread 132 wakes up and resumes executing on the CPU. In this example, dynamic CPU multitasking process 10 may determine that at time "t5" until time "t6", the operating system thread is idle. At time "t7" (e.g., after the predefined CPU execution release interval of e.g., 100 µs), dynamic CPU multitasking process 10 may release 316 the CPU from executing the block application for the predefined CPU execution release duration (e.g., 50 µs) and the predefined CPU execution release interval (e.g., 100 µs).

At time "t8", a non-block application (e.g., file application 130) may execute for the entire predefined CPU execution release duration (e.g., 50 µs). In this example, dynamic CPU multitasking process 10 may have raised the priority of the suspended operating system thread in order to schedule back operating system thread 132 after the end of the predefined CPU execution release duration. Accordingly, dynamic CPU multitasking process 10 may determine that a full used release (FUR) occurred at time "t9". At time "t9", another operating system thread may raise the priority of operating system thread 132 such that operating system thread 132 wakes up and resumes executing on the CPU.

In some implementations, at time "t10", dynamic CPU multitasking process 10 may decrease 322 the previous CPU execution release interval and increase the previous CPU execution release duration in response to determining a high non-block application utilization and a low block application utilization. In this example and in response to determining a high FUR (e.g., two or more FUR occurrences in this example) and in response to determining that the block application idle percentage (BIP) is high (e.g., greater than or equal to 50% in this example), dynamic CPU multitasking process 10 may decrease 322 the previous CPU execution release interval from e.g., 100 µs to e.g., 50 µs and increase the previous CPU execution release duration from e.g., 50 µs to e.g., 100 µs. Accordingly, dynamic CPU multitasking process 10 may release the CPU at time "t11" for the adjusted CPU execution release duration (e.g., 100 µs) at the adjusted CPU execution release interval (e.g., 50 µs). At time "t12", a non-block application (e.g., file application 130) may execute for the entire predefined CPU execution release duration (e.g., 100 µs). In this example, dynamic CPU multitasking process 10 may have raised the priority of the suspended operating system thread in order to schedule back operating system thread 132 after the end of the predefined CPU execution release duration.

Accordingly, dynamic CPU multitasking process 10 may determine that a full used release (FUR) occurred at time "t12". At time "t12", another operating system thread may raise the priority of operating system thread 132 such that operating system thread 132 wakes up and resumes executing on the CPU. At time "t13", dynamic CPU multitasking process 10 may release the CPU for the adjusted CPU execution release duration (e.g., 100 µs) at the adjusted CPU execution release interval (e.g., 50 µs). In this manner, dynamic CPU multitasking process 10 may continue to dynamically adjust the CPU execution release duration and/or the CPU execution release interval. In some implementations, dynamic CPU multitasking process 10 may continue to incrementally adjust 318 one or more of the previous CPU execution release interval and the previous CPU execution release duration.

In some implementations, when dynamic CPU multitasking process 10 determines that the CPU utilization of a non-block application (e.g., file application 130) increases, the corresponding CPU execution release interval and/or CPU execution release duration may be decreased exponentially, to prevent starvation.

In some implementations, generating 304 the CPU execution release interval and the CPU execution release duration for the block application may include incrementally adjusting 318 one or more of a previous CPU execution release interval and a previous CPU execution release duration as shown below in the example scenarios of Table 1:

TABLE 1

| Scenario | Block application condition | File application condition | Action by dynamic CPU multitasking process 10 | Result |
| --- | --- | --- | --- | --- |
| High utilization by block application, low utilization by file application | Low BIP (Block is not idle) | HighNUR (File doesn't use CPU) | Increase CRI | Block application is executed for longer duration, overhead is reduced as the CPU release frequency decreases. |
| High utilization by file application, fully utilizing given time | Low BIP | High FUR | Increase CRD | File application is executed for longer duration, overhead is reduced as the CPU release frequency decreases. |
| High utilization by file application and low utilization by block application | High BIP | High FUR | Decrease CRI Increase CRD | File application is executed for longer duration, overhead is reduced as the CPU release frequency decreases. |
| Medium utilization by file application with CPU releases too frequently | — | High PUR | Increase CRI | File application aggregates more work to execute for longer continues durations. |
| File application becomes active after being idle | High CRI | Low CRD High FUR | Decrease CRI | File application is executed on the CPU more frequently. |
| Block application | Low CRI Low BIP | | Increase CRI | Block application executes on the |

TABLE 1-continued

| Scenario | Block application condition | File application condition | Action by dynamic CPU multitasking process 10 | Result |
|---|---|---|---|---|
| becomes active after being idle | | | | CPU for longer durations. |

While Table 1 may provide example scenarios of how dynamic CPU multitasking process 10 may incrementally adjust 318 one or more of a previous CPU execution release interval and a previous CPU execution release duration, it will be appreciated that other configurations in the block and non-block application utilizations and other scenarios are possible for adjusting the CPU execution release interval and the CPU execution release duration within the scope of the present disclosure. In some implementations, the amount by which the CPU execution release duration and/or the CPU execution release interval are adjusted may depend on storage system requirements and may be tuned accordingly. For example, the amount and frequency by which the CPU execution release duration and/or the CPU execution release interval are adjusted may be based upon, at least in part, a block application latency requirement, a requirement to set a limit on the ratio between the block application execution utilization and the file application execution utilization, etc.

Optimizing I/O Latency While Efficiently Utilizing CPU Cycles:

In accordance with certain embodiments, a computer device is aware of which application tasks are I/O-critical tasks and which application tasks are background tasks. Such awareness enables the computer device to make smart decisions regarding which application will next use the CPU (e.g., a block application vs. a non-block application) and/or which tasks of that application should run (e.g., an I/O-critical thread vs. a background thread).

Along these lines, it should be appreciated that prioritizing I/O-critical threads over background threads reduces I/O latency. Additionally, running background threads (e.g., when there are no I/O-critical threads to run or after a starvation prevention threshold has been reached) improves computer device efficiency/health/etc. (e.g., by reclaiming resources, optimizing storage of data, and so on).

It should be further appreciated that any suitable computer device may be utilized. By way of example, FIG. 9 shows the earlier-described storage system 12 which is provides CPU sharing between a block application 128 and a file application 130 (also see FIGS. 1-2), but where certain components have been added and/or augmented to facilitate awareness of I/O-critical tasks and background tasks.

Along these lines, the storage system 12 performs a variety of tasks 900 that enables the storage system 12 to richly and robustly manage data on behalf of one or more hosts (e.g., see the various client applications 22, 24, 26, 28 in FIG. 1). With regard to such tasks 900, the block application 128 includes I/O critical threads 910 and background threads 920 (i.e., block threads). Similarly, the file application 130 includes I/O critical threads 930 and background threads 940 (i.e., file threads).

One should appreciate that the block application 128 may include any number of I/O-critical threads 910 and any number of background threads 920, and that the earlier-described sub-threads (e.g., see sub-threads 134, 136) of the block application 128 are representative of such threads 910, 920. Likewise, the file application 130 may include any number of I/O-critical threads 930 and any number of background threads 940.

Figure 9:
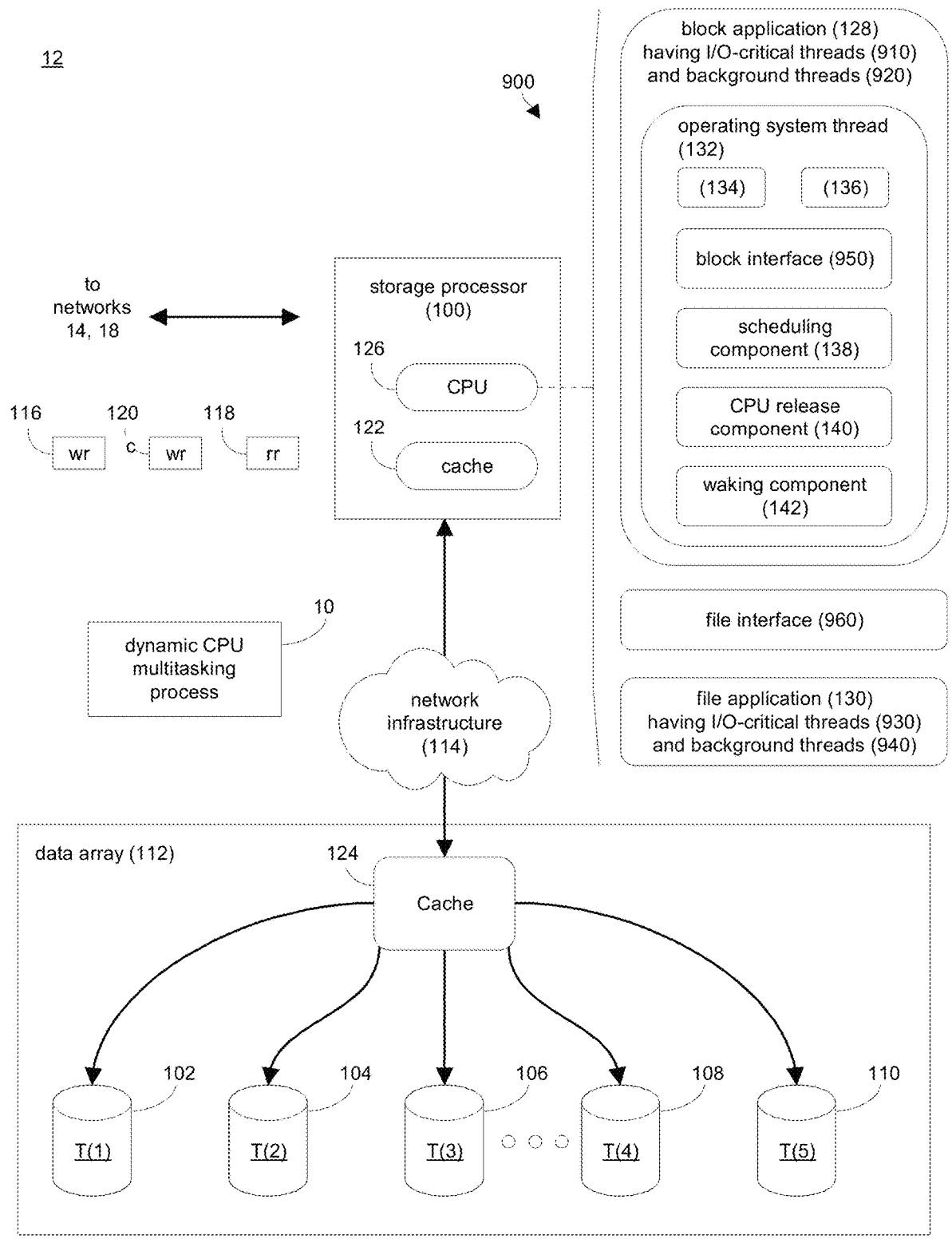
FIG. 9 is another example diagrammatic view of a storage system and a dynamic CPU multitasking process coupled to a distributed computing network according to one or more example implementations of the disclosure.

As further shown in FIG. 9, the operating system thread 132 includes, among other components that were described earlier in connection with FIG. 2, a block interface 950 which may be accessed by various components of the block application 128 such as a block data-path component (e.g., one of the sub-threads 134, 136) and a CPU sharing component (e.g., the scheduling component 138). As will be explained in further detail shortly, the block interface 950 is constructed and arranged to indicate whether the block application 128 has any I/O-critical threads 910 and any background threads 920, and to identify the status of those threads 910, 920 (e.g., ready/suspended, high/medium/low priority, etc.).

Similarly, as further shown in FIG. 9, a file interface 960 resides between the block application 128 and the file application 130. As will be explained in further detail shortly, the file interface 960 is constructed and arranged to indicate whether the file application 130 has any I/O-critical threads 930 and any background threads 940, and to identify the status of those threads 930, 940 (e.g., ready/suspended, high/medium/low priority, etc.).

During operation, the scheduling component 138 of the block application 128 encounters decision points in which the scheduling component 138 decides whether to release the CPU 126 to the file application 130 or whether to continue consuming cycles of the CPU 126. Examples of such decision points include reaching the end of a current CPU cycle such as expiration of a CPU release interval or a CPU release duration, completion of a submitted I/O request by the data array 112, and so on.

When encountering a decision point, the scheduling component 138 is able to query the block interface 950 to determine which threads 910, 920 of the block application 128 are ready (i.e., which block threads are not suspended and ready to take the CPU 126). Likewise, the scheduling component 138 is able to access the file interface 960 to determine which threads 930, 940 of the file application 130 are ready (i.e., which file threads are not suspended and ready to take the CPU 126).

The scheduling component 138 may apply a set of decision making criteria when determining whether to continue using the CPU 126 or release the CPU 126. For example, in response to expiration of the CPU release interval, the scheduling component 138 may determine that there is at least one I/O-critical file thread 930 that is ready and thus release the CPU 126 to the file application 130. Such awareness of I/O-critical tasks minimizes I/O latency for file operations.

As another example, in response to expiration of another CPU release interval, the scheduling component 138 may determine that there are no I/O-critical file threads 930 that are ready and only background file threads 940 that are ready. In such a situation, the scheduling component 138 may decide not relinquish the CPU 126 to the file application 130 unless a starvation threshold has been reached. Accordingly, a ready I/O-critical block thread 910 may take the CPU 126 next. Such awareness of I/O-critical tasks may thus minimize I/O latency for block operations.

It should be understood that, if the starvation threshold has been reached while there are no I/O-critical file threads 930 that are ready but while there is at least one background file thread 940 that is ready, the scheduling component 138 may still decide to release the CPU 126 to the file application 130. Such operation avoids starvation of background file threads 940.

As yet another example, suppose that the block application 128 is scheduled to resume use of the CPU 126 (e.g., in response to expiration of the CPU release duration). Further suppose that the scheduling component 138 determines that there are no I/O-critical block threads 910 that are ready but only background block threads 920 that are ready. Furthermore, the scheduling component 138 may determine that there is at least one I/O-critical file thread 930 that is ready. In such a situation, the scheduling component 138 may release the CPU 126 back to the file application 130. Such awareness of I/O-critical tasks minimizes I/O latency for file operations.

However, if a starvation threshold has been reached while there are no I/O-critical block threads 910 that are ready but while there is at least one background block thread 920 that is ready, the scheduling component 138 may still decide to continue using the CPU 126. Such operation avoids starvation of background block threads 920.

Other examples include making adjustments to one or more operating parameters (or metrics) based on awareness of I/O-critical tasks. For example, the scheduling component 138 may ascertain times in which there are I/O-critical block threads 910 that are ready as well as I/O-critical file threads 930 that are ready. In such times, the scheduling component 138 may reduce the CPU release interval and/or the CPU release duration. Such a modification enables reduction of PO latency of both block and file operations (e.g., avoiding situations in which a block operation or a file operation consumes too much CPU time).

Similarly, the scheduling component 138 may ascertain times in which there are no I/O-critical block threads 910 that are ready and no I/O-critical file threads 930 that are ready (e.g., there are only background block threads 920 and background file threads 940 that are ready). In such times, the scheduling component 138 may increase the CPU release interval and/or the CPU release duration. Such a modification reduces context switching between operations thus minimizing overhead and improving system performance.

It should be understood that there are a variety of techniques for distinguishing I/O-critical tasks from background tasks. In some embodiments, the technique for distinguishing I/O-critical file tasks and background file tasks may be different from the technique for distinguishing I/O-critical block tasks and background block tasks.

In accordance with certain embodiments, the block application 128 queries the file interface 960 between the block application 128 and the file application 130 to distinguish between I/O-critical file tasks from background file tasks. Along these lines, each file thread may be named in a manner that identifies whether that file thread is an I/O-critical thread 930 or a background thread 940 of the file application 130. For example, the name of each I/O-critical file thread 930 may begin with the prefix "bkg" and the name of each background file thread 940 may begin with the prefix "io". Other naming acronyms and/or schemes may be used as well.

Likewise, in accordance with certain embodiments, the block interface 950 between the data-path components 134, 136 and the scheduling component 138 may be provisioned with a function that enables querying to indicate whether a block task is an I/O-critical block thread 910 or a background block thread 920. In addition to providing such status, the block interface 950 may be further provisioned to identify a priority level for each block task (e.g., high, medium, low, etc.). Further details will now be provided with reference to FIG. 10.

Figure 10:
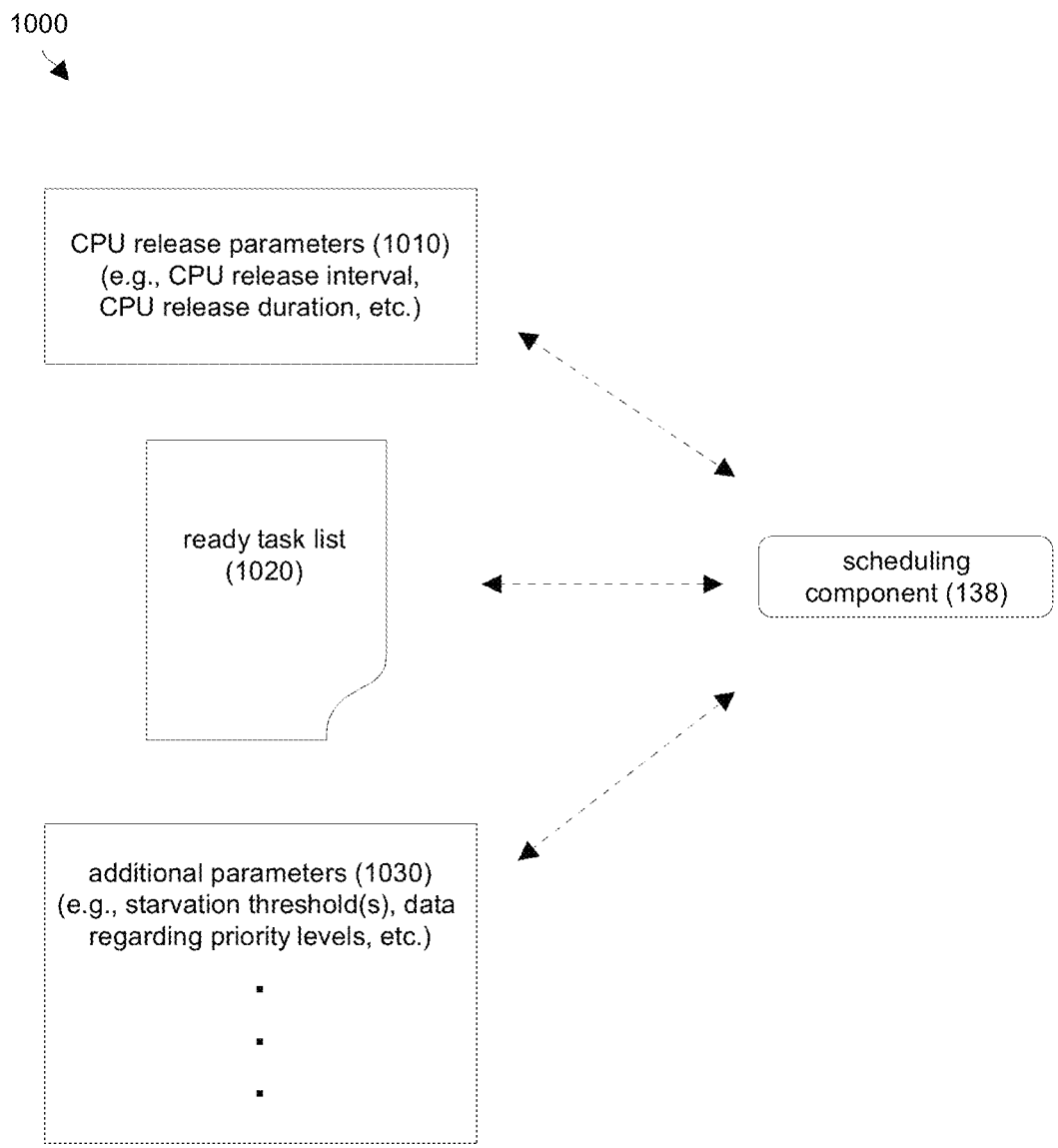
FIG. 10 is an example diagrammatic view showing a CPU scheduling component which accesses block and file interfaces to obtain awareness of I/O-critical tasks and background tasks within a computer device.

FIG. 10 shows various control input sources 1000 that may impact decision making analytics carried out by the scheduling component 138. The control input sources 1000 include CPU release parameters (or criteria) 1010, a ready task list 1020, and additional parameters 1030.

The CPU release parameters 1010 refers to metrics or values that control CPU sharing by the applications 128, 130. For example, the CPU release interval defines how long the block application 128 uses the CPU 126 (FIG. 9) before the block application 128 tries releasing the CPU 126 to the file application 130. Additionally, the CPU release duration defines the maximum time the file application 130 is permitted to use the CPU 126 before the block application 128 is scheduled to take the CPU 126 back.

Furthermore, the ready task list 1020 represents information that provides awareness of ready I/O-critical tasks and ready background tasks to the scheduling component 138. The ready task list 1020 may reside in one location within the computer device or may be distributed (i.e., where the aggregation of multiple information sources forms the ready task list 1020). Moreover, such a ready task list 1000 may be updated by a variety of different sources such as the scheduling component 138 or any of the application tasks 900.

In accordance with certain embodiments, the ready task list 1000 is formed by at least a portion of block interface 250 and/or at least a portion of the file interface 260 (also see FIG. 9). Other implementations are suitable for use as well such as making the ready task list 1000 separate from the block interface 250 and/or the file interface 260.

In a particular Linux-based implementation, at least a portion of the ready task list 1000 resides in the 'proc' file system (e.g., "/proc/sched debug") which is accessed by the scheduling component 138. Alternatively, a kernel module may get the ready tasks.

The additional parameters 1030 represents other control metrics that the scheduling component 138 accesses when making the decision as to whether to release the CPU 126 to the file application 130. For example, the additional parameters 1030 may include one or more starvation thresholds that enable the scheduling component 138 to override a decision if a background task has not run for a predefined period of time to prevent starvation of that background task. As another example, the additional parameters 1030 may include other data that enables the scheduling component 138 to prioritize tasks using priority levels (e.g., high, medium, low, etc.), and so on. Further details will now be provided with reference to FIG. 11.

Figure 11:
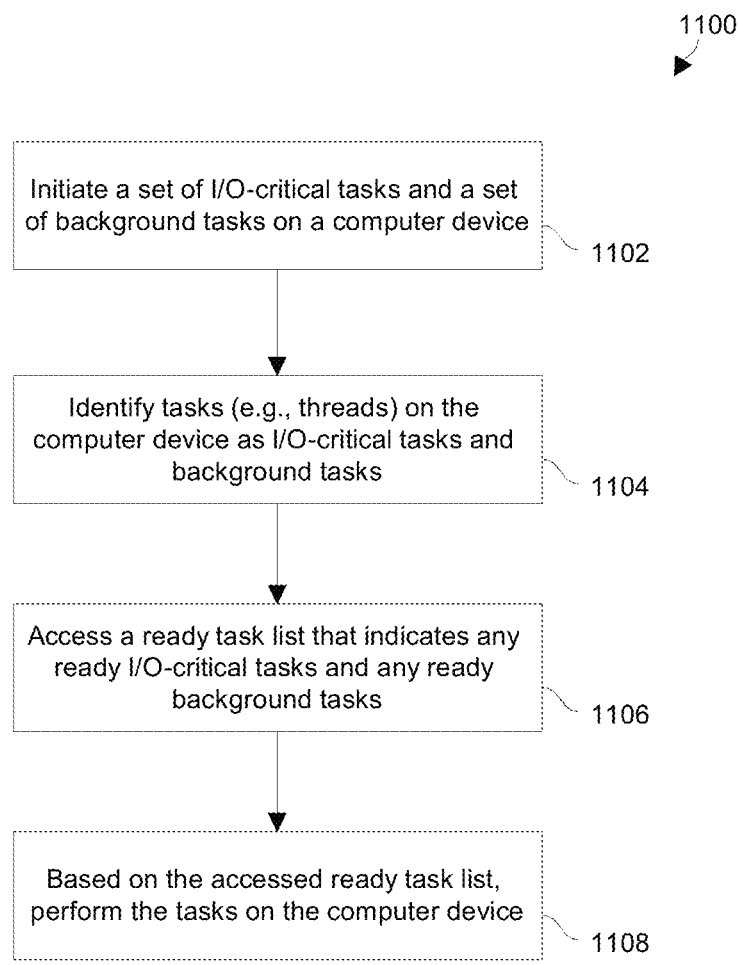
FIG. 11 is another example flowchart of dynamic CPU multitasking process according to one or more example implementations of the disclosure.

FIG. 11 shows a computer-implemented procedure 1100 in accordance with certain embodiments. Such a procedure 1100 enables management of I/O-critical and background tasks within a computer device that allows CPU sharing applications so that I/O latencies are reduced while CPU cycles are still efficiently utilized.

At 1102, the computer device initiates a set of I/O-critical tasks and a set of background tasks. Examples of I/O-critical tasks include block-based read operations, block-based write operations, file-based read operations, file-based write operations, and other operations that satisfy I/O requests. Examples of background tasks include garbage collection (i.e., consolidating valid data from sparsely consumed memory locations), deduplication, replication, snapshotting, archiving, data recovery operations, and so on.

At 1104, the computer device identifies the tasks on the computer device as I/O-critical tasks and background tasks.

In accordance with certain embodiments and as described earlier, such identification may involve using acronyms (e.g., prefixes such as "io" to identify I/O-critical file threads, "bkg" to identify background file threads, etc.). Also, such identification may involve simply defining data structures for block threads so that a function can be called to access those data structures to determine whether the block threads are I/O-critical threads or background threads. Other task identification mechanisms are suitable for use as well.

At 1106, the computer device accesses a ready task list that indicates whether there are currently any ready I/O-critical tasks and any ready background tasks (also see FIG. 10). As explained earlier, a ready task is not suspended but ready to run on the CPU 126.

At 1108, the computer device performs the task based on the ready task list. Along these lines, at decision points, the computer device smartly chooses which application will next use the CPU (e.g., a block application vs. a non-block application) and/or which tasks of that application should run (e.g., an I/O-critical thread vs. a background thread). For example, the block application of the computer device may override decisions to release the CPU to the file application if there are ready I/O-critical block threads but there are no I/O-critical file threads (unless a starvation threshold has passed). Similarly, the block application of the computer device may override decisions to take back the CPU from the file application if there are ready I/O-critical file threads but there are no I/O-critical block threads (unless a starvation threshold has passed).

Additionally, the computer device may shorten certain CPU release values such as the earlier-mentioned CPU release interval and CPU release duration when there are both I/O-critical block threads and I/O-critical file threads that are ready. Such operation reduces block application I/O latency and the file application I/O latency.

Furthermore, the computer device may lengthen certain CPU release values such as the earlier-mentioned CPU release interval and CPU release duration when there are only background block threads and background file threads that are ready (i.e., there are no I/O-critical threads that are ready). Such operation reduces context-switching within the computer device thus improving system performance/efficiency.

As described above, improved techniques are directed to managing I/O-critical and background tasks (e.g., threads) 900 within a computer device that allows CPU sharing applications 128, 130 (e.g., sharing of a CPU 126 between a block application 128 and a non-block application 130). Such techniques enable the computer device to make better decisions that reduce I/O latencies while still efficiently utilizing CPU cycles. Moreover, such techniques enable the computer device to prevent starvation of background tasks.

It should be appreciated that a standard storage system may implement a block interface and share the CPU with a file application. The sharing mechanism may be implemented in the block application and make decisions about when and for how long to release the CPU based solely on the CPU usage measurement of both applications.

However, although this standard mechanism does a great job in terms of efficient CPU utilization, such that there is minimal waste of CPU cycles, it may cause a significant increase in I/O latencies for both block and file applications, since the mechanism does not differentiate between IO-critical and background tasks. For example, the mechanism may prefer file background tasks over block IO-critical tasks, and vice versa, which would cause increased I/O latencies in both applications and may even end up with client I/O timeouts.

In contrast to the above-described standard storage system, certain embodiments are directed to a computer device that allows the CPU sharing mechanism to be aware of I/O-critical and background tasks, thus allowing the computer device to make better decisions that will optimize the I/O latencies while still efficiently utilize the CPU cycles.

Some embodiments are directed to using a distributed storage system with nodes that are connected in a full-mesh network, managed by a system manager. Each node includes a multi core CPU and a disks array, and runs a block application on top of a preemptive operating system (OS). It should be understood that preemptive OS refers to an OS that can preempt (i.e. stop) a running OS-thread, and execute something else, for example another OS-Thread.

The block application runs as a single hard affined OS-thread per each CPU core (referred to as a "truck"), which implements block-based functionality. A truck runs multiple X-threads, which are a lightweight implementation of a thread, and implements a scheduler that supports suspension and resumption of X-threads.

Each truck polls its interfaces for new events. For example, the truck polls for new IO requests from the user (e.g., a front-end poller), polls for completions of submitted I/O requests to the disk array (e.g., a back-end poller), and so on. Therefore, each truck is by design fully utilizing the CPU core it's running on, because even when there's no actual work, the truck continues checking its interfaces. In accordance with certain embodiments, this always-polling design is optimized for a storage system that requires low latency and high IOPS (I/O per second) as there are no context switches, and no interrupts involved.

The storage system further runs a file application (i.e. another process, perhaps in a different OS container) on the same CPU cores that provide a file interface to the user of the system. Accordingly, it should be appreciated that use patterns of the storage system may dynamically change over time, e.g., the user of the system can use only the block application for some time and then use only the file application, and can use both of applications simultaneously, each with a different load that can also change.

Advantageously, the storage system has the ability to dynamically adapt to such changes in use pattern. For example, the storage system performs dynamic load balancing but is able to override decisions to remain healthy, prevent timeouts, etc. To this end, such a storage system provides an adaptive mechanism for the CPU utilization between the applications. Based on measuring the CPU utilization and behavior of both block and file, the storage system tunes the following two parameters that determine which application runs on the CPU:

1. CPU Release Interval: the continuous time that the block application runs until it tries to release the CPU, for the file (or other non-block) application.
2. CPU Release Duration: the maximum time the file (or other non-block) application is given before the block application is scheduled back.

In accordance with certain embodiments, the block application is equipped to make decisions about when and for how long to release the CPU based solely on the CPU usage measurement of both applications. Such operation may be controlled by a scheduling component of the block application.

However, although this mechanism may do a great job in terms of efficient CPU utilization in a standard storage system, such that there is minimal penalty of waste CPU cycles, it may cause to significant increase in I/O latencies of both block and file applications. The reason is that the mechanism doesn't differentiate between I/O-critical and background tasks where I/O-critical tasks are usually performed in the synchronous part of the I/O processing (i.e. before the I/O is acknowledged) and have a direct impact on I/O latency and where background tasks may be deferred to a later time to be performed when there are less I/Os in the system. It should be understood that background tasks may include data reduction (e.g. compression), metadata defragmentation, etc. Therefore, the mechanism in the standard storage system may prefer file background tasks over block I/O-critical tasks, and vice versa, which will cause to increased PO latencies in both applications, and may even end up with client I/O timeouts.

In accordance with certain embodiments, a CPU sharing mechanism is aware of I/O-critical and background tasks. Such awareness enables the CPU sharing mechanism to make better decisions that will optimize the I/O latencies while still efficiently utilizing CPU cycles. That is, such awareness provides for a storage system with an I/O-critical and background aware multitasking mechanism for improved I/O latency.

In accordance with certain embodiments, the block application is aware of which threads of the file application are I/O-critical and which are background. Having this information, when the CPU sharing mechanism (which is implemented in the block internal scheduler) gets to make decision of whether to pass the CPU to the file application, the CPU sharing mechanism receives an indication from the OS of which file threads are ready to run, and is able to make better decisions, i.e. avoid releasing the CPU if the block application currently has IO-critical tasks ready while the file application has only background tasks ready.

In accordance with certain embodiments, a file interface resides between the file and block applications that allows the block application to know which file threads are IO-critical and which are background. The block application periodically updates this information. An example for such mechanism involves naming all background threads to start with unique prefix such as "bkg", while naming all I/O-critical threads names to start with another unique prefix such as "io". Such a mechanism does not require passing any messages between the two applications.

Additionally, a block interface (e.g., see component 950 in FIG. 9) is disposed between the block data-path component and the CPU sharing component (e.g., components 134, 136, and 138 in FIG. 9). The data-path components indicate whether they are I/O-critical or background tasks. Since all of these components run within the block application, this block interface may be a simple function that the CPU sharing component may run to query the current status of the block application. In some arrangements, this feature is extended to include more levels of I/O-Critical tasks (e.g. high, medium, low, etc.).

When the CPU sharing component reaches a decision point, the CPU sharing component obtains an indication from the OS of the currently ready threads (i.e. threads that are not suspended and are ready to take the CPU). In some arrangements, the CPU sharing component accesses a ready tasks list through the file-system where the OS exposes this information, e.g., in Linux the 'proc' file system ("/proc/sched debug") is suitable for such use. In some arrangements, a kernel module identifies ready tasks.

Given this information, the CPU sharing component differentiates among a variety of scenarios (or situations). For example, at decision points, the CPU sharing component smartly makes CPU sharing decisions based on awareness of ready I/O-critical tasks and ready background tasks.

In one example scenario, suppose that the CPU sharing component normally decides to release the CPU to the file application because the CPU release interval has ended (i.e., a standard decision). However, if at that moment, the file application has only background tasks and the block application has IO-critical tasks, the CPU sharing component may override the standard decision and keep running the block application. If, however, a certain threshold has passed, the CPU may be released to the file application to avoid starvation of a file-based background task.

In another example scenario, suppose that the CPU sharing component normally decides to provide the CPU to the Block application (e.g., it is the end of the CPU release duration). However, if at that moment the file application has at least one IO-critical ready thread while the block application has only background threads, then the CPU sharing component may override the normal decision by releasing the CPU to the file application. If, however, a certain threshold has passed, the CPU may not be released to the file application to avoid starvation of a block-based background task.

Moreover, there may be situations in which one or more of the operating parameters that control sharing of the CPU are modified. For example, recall that the CPU release interval defines the continuous amount of time that the block application may run before releasing the CPU to the file application, and that the CPU release duration defines the maximum amount of time that the file application is given the CPU before the CPU is scheduled back to the block application. In accordance with certain embodiments, when both the block application and the file application have IO-critical tasks, the CPU sharing component shortens the CPU release interval and CPU release duration. Such shortening optimizes I/O latency of block and file by preventing any one of them from taking the CPU for too long a time.

Similarly, in accordance with certain embodiments, when both the block application and the file application have only background tasks, the CPU sharing component extends the CPU release interval and CPU release duration. Such increasing of these parameters reduces CPU cycles wasted in performing context-switches and thus improves system performance.

As described above, the computer device is aware of IO-critical and background tasks of both applications. Such awareness enables the CPU sharing component to make better decisions for reducing I/O Latency of both applications, while still optimizing CPU utilization.

Further Details:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims. Such modifications and enhancements are intended to belong to various embodiments of the disclosure.

What is claimed is:

1. A computer-implemented method, executed on a computer device, comprising:
   identifying tasks on the computer device as input/output (I/O)-critical tasks and background tasks;
   accessing a ready task list that indicates any ready I/O-critical tasks and any ready background tasks;
   based on the accessed ready task list, performing the tasks on the computer device;
   initiating a block application and a non-block application on a central processing unit (CPU) of the computerized device, the block application being constructed and arranged to manage access to the CPU on behalf of the block application and the non-block application; and
   releasing, by the block application, the CPU to the non-block application in accordance with a set of CPU release criteria to enable the block application and the non-block application to share the CPU as the tasks are performed on the computer device.

2. A computer-implemented method as in claim 1 wherein the block application performs block-based operations on data;
   wherein the non-block application is a file application that performs file-based operations on data; and
   wherein identifying the tasks on the computer device includes:
      distinguishing threads of the file application into a set of I/O-critical file threads and a set of background file threads.

3. A computer-implemented method as in claim 1 wherein accessing the ready task list includes:
   encountering a decision point on the computer device, and
   in response to encountering the decision point and based on the ready task list, selecting a next thread to run on the computer device.

4. A computer-implemented method as in claim 1 wherein the block application performs block-based operations on data;
   wherein the non-block application is a file application that performs file-based operations on data; and
   wherein performing the tasks on the computer device includes:
      sharing the CPU between the block application and the non-block application in accordance with a CPU release duration parameter that defines an amount of CPU time available for the block application and a CPU release duration parameter that identifies an amount of CPU time available for the file application.

5. A computer-implemented method as in claim 1 wherein the non-block application is a file application that performs file-based operations on data;
   wherein the file application includes a set of I/O-critical file threads and a set of background file threads; and
   wherein identifying the tasks on the computer device includes:
      providing a first character string in a thread name of each I/O-critical file thread of the set of I/O-critical file threads and a second character string in a thread name of each background file thread of the set of background file threads, the first character string being different from the second character string.

6. A computer-implemented method as in claim 1 wherein the block application performs block-based operations on data;
   wherein the block application includes a set of I/O-critical block threads and a set of background block threads; and
   wherein identifying the tasks on the computer device includes:
      providing one of at least three different priority levels to each I/O-critical block thread of the set of I/O-critical block threads.

7. A computer-implemented method as in claim 2 wherein identifying the tasks on the computer device further includes:
   distinguishing threads of the block application into a set of I/O-critical block threads and a set of background block threads.

8. A computer-implemented method as in claim 3 wherein the block application performs block-based operations on data;
   wherein the non-block application is a file application that performs file-based operations on data;
   wherein encountering the decision point includes:
      expiring a CPU release interval that defines an amount of CPU time available for consumption by the block application; and
   wherein selecting the next thread to run on the computer device includes:
      determining that there are no I/O-critical file threads of the file application that are ready and that there is at least one I/O-critical block thread of the block application that is ready, and
      choosing a ready I/O-critical block thread of the block application as the next thread to run on the computer device to override release of the CPU to the file application.

9. A computer-implemented method as in claim 3 wherein the block application performs block-based operations on data;
   wherein the non-block application is a file application that performs file-based operations on data;
   wherein encountering the decision point includes:
      expiring a CPU release interval that defines an amount of CPU time available for consumption by the block application; and
   wherein selecting the next thread to run on the computer device includes:
      determining that (i) there are no I/O-critical file threads of the file application that are ready, (ii) there is at least one background file thread of the file application that is ready, and (iii) that there is at least one I/O-critical block thread of the block application that is ready, and
      determining that a starvation avoidance threshold has been reached, and
      in response to determining that the starvation avoidance threshold has been reached, choosing a ready background filed thread of the file application as the next thread to run on the computer device to prevent starvation of the ready background filed thread.

10. A computer-implemented method as in claim 3 wherein the block application performs block-based operations on data;
    wherein the non-block application is a file application that performs file-based operations on data; and
    wherein selecting the next thread to run on the computer device includes:
       upon the block application being ready to enter a CPU release interval that defines an amount of CPU time available for consumption by the block application, determining that there is at least one I/O-critical file thread of the file application that is ready and that there are no I/O-critical block threads of the block application that are ready, and
choosing a ready I/O-critical file thread of the file application as the next thread to run on the computer device to override consumption of the CPU release interval by the block application.

11. A computer-implemented method as in claim 3 wherein the block application performs block-based operations on data;
wherein the non-block application is a file application that performs file-based operations on data; and
wherein selecting the next thread to run on the computer device includes:
upon the block application being ready to enter a CPU release interval that defines an amount of CPU time available for consumption by the block application, determining that (i) there are no I/O-critical block threads of the block application that are ready, (ii) there is at least one background block thread of the block application that is ready, and (iii) that there is there is at least one I/O-critical file thread of the file application that is ready,
determining that a starvation avoidance threshold has been reached, and
in response to determining that the starvation avoidance threshold has been reached, choosing a ready background block thread of the block application as the next thread to run on the computer device to prevent starvation of the ready background block thread.

12. A computer-implemented method as in claim 4 wherein accessing the ready task list includes:
determining that there is at least one I/O-critical block thread of the block application that is ready and that there is at least one I/O-critical file thread of the file application that is ready; and
wherein the computer-implemented method further comprises:
shortening each of the CPU release duration parameter and the CPU release duration parameter to reduce I/O latency.

13. A computer-implemented method as in claim 4 wherein accessing the ready task list includes:
determining that there are no I/O-critical block threads of the block application that are ready and that there are no I/O-critical file threads of the file application that are ready; and
wherein the computer-implemented method further comprises:
lengthening each of the CPU release duration parameter and the CPU release duration parameter to reduce context-switching frequency.

14. A computer device, comprising:
memory; and
control circuitry coupled to the memory, the memory storing instructions which, when carried out by the control circuitry, cause the control circuitry to:
identify tasks on the computer device as input/output (I/O)-critical tasks and background tasks,
access a ready task list that indicates any ready I/O-critical tasks and any ready background tasks, and
based on the accessed ready task list, perform the tasks on the computer device;
initiate a block application and a non-block application on a central processing unit (CPU) of the computerized device, the block application being constructed and arranged to manage access to the CPU on behalf of the block application and the non-block application; and
release, by the block application, the CPU to the non-block application in accordance with a set of CPU release criteria to enable the block application and the non-block application to share the CPU as the tasks are performed on the computer device.

15. A computer device as in claim 14
wherein the block application performs block-based operations on data;
wherein the non-block application is a file application that performs file-based operations on data; and
wherein identifying the tasks on the computer device includes:
distinguishing threads of the file application into a set of I/O-critical file threads and a set of background file threads, and
distinguishing threads of the block application into a set of I/O-critical block threads and a set of background block threads.

16. A computer device as in claim 15 wherein the control circuitry, when accessing the ready task list, is constructed and arranged to:
encounter a decision point on the computer device, and
in response to encountering the decision point and based on the ready task list, select a next thread to run on the computer device.

17. A computer program product having a non-transitory computer readable medium which stores a set of instructions to manage tasks, the set of instructions, when carried out by a computer device, causing the computer device to perform a method of:
identifying tasks on the computer device as input/output (I/O)-critical tasks and background tasks;
accessing a ready task list that indicates any ready I/O-critical tasks and any ready background tasks; and
based on the accessed ready task list, performing the tasks on the computer device;
initiating a block application and a non-block application on a central processing unit (CPU) of the computerized device, the block application being constructed and arranged to manage access to the CPU on behalf of the block application and the non-block application; and
releasing, by the block application, the CPU to the non-block application in accordance with a set of CPU release criteria to enable the block application and the non-block application to share the CPU as the tasks are performed on the computer device.

18. A computer-implemented method, executed on a computer device, comprising:
identifying tasks on the computer device as input/output (I/O)-critical tasks and background tasks;
accessing a ready task list that indicates any ready I/O-critical tasks and any ready background tasks;
based on the accessed ready task list, performing the tasks on the computer device; and
initiating a block application and a non-block application on a central processing unit (CPU) of the computerized device, the block application being constructed and arranged to manage access to the CPU on behalf of the block application and the non-block application;
wherein the block application performs block-based operations on data;
wherein the non-block application is a file application that performs file-based operations on data; and wherein identifying the tasks on the computer device includes:
  distinguishing threads of the file application into a set of I/O-critical file threads and a set of background file threads.

19. A computer-implemented method as in claim 18 wherein identifying the tasks on the computer device further includes:
  distinguishing threads of the block application into a set of I/O-critical block threads and a set of background block threads.

20. A computer-implemented method, executed on a computer device, comprising:
  identifying tasks on the computer device as input/output (I/O)-critical tasks and background tasks;
  accessing a ready task list that indicates any ready I/O-critical tasks and any ready background tasks;
  based on the accessed ready task list, performing the tasks on the computer device; and
  initiating a block application and a non-block application on a central processing unit (CPU) of the computerized device, the block application being constructed and arranged to manage access to the CPU on behalf of the block application and the non-block application;
  wherein the block application performs block-based operations on data;
  wherein the non-block application is a file application that performs file-based operations on data; and
  wherein performing the tasks on the computer device includes:
  sharing the CPU between the block application and the non-block application in accordance with a CPU release duration parameter that defines an amount of CPU time available for the block application and a CPU release duration parameter that identifies an amount of CPU time available for the file application.

* * * * *